US012717683B2

(12) United States Patent
Hiltunen

(10) Patent No.: US 12,717,683 B2
(45) **Date of Patent: *Aug. 25, 2026**

(54) TRANSACTIONAL ACCESS TO RESOURCE REPOSITORIES

(71) Applicant: GitLab Inc., San Francisco, CA (US)

(72) Inventor: Sami Hiltunen, San Francisco, CA (US)

(73) Assignee: GitLab Inc., San Francisco, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 19/092,627

(22) Filed: Mar. 27, 2025

(65) Prior Publication Data

US 2025/0225036 A1 Jul. 10, 2025

Related U.S. Application Data

(63) Continuation of application No. 18/368,378, filed on Sep. 14, 2023, now Pat. No. 12,298,859.

(51) Int. Cl.
*G06F 11/1446* (2026.01)
*G06F 16/23* (2019.01)

(52) U.S. Cl.
CPC ...... *G06F 11/1458* (2013.01); *G06F 16/2365* (2019.01)

(58) Field of Classification Search
None
See application file for complete search history.

(56) References Cited

U.S. PATENT DOCUMENTS

| | | | | |
|---|---|---|---|---|
| 10,585,876 | B2 | 3/2020 | Brodt et al. | |
| 10,740,287 | B2 | 8/2020 | Haviv et al. | |
| 10,909,069 | B2 | 2/2021 | Haviv et al. | |
| 11,169,797 | B2 * | 11/2021 | Mezaael | H04W 4/40 |
| 11,599,514 | B1 | 3/2023 | Agrawal et al. | |
| 11,709,809 | B1 | 7/2023 | Li et al. | |
| 11,886,422 | B1 | 1/2024 | Li et al. | |
| 12,007,990 | B1 * | 6/2024 | Katsipoulakis | G06F 16/27 |
| 12,007,993 | B1 * | 6/2024 | Angius | G06F 16/24535 |
| 12,061,587 | B2 | 8/2024 | Katsipoulakis et al. | |

(Continued)

OTHER PUBLICATIONS

A Read-Only Transaction Anomaly Under Snapshot Isolation (Year: 2004).*

(Continued)

*Primary Examiner* — Kim T Nguyen
(74) *Attorney, Agent, or Firm* — Fenwick & West LLP

(57) ABSTRACT

Resources, like source code, can be stored in a repository and managed through a resource repository system. The resource repository system includes a processor and a memory for storing a plurality of data structures, each data structure comprising a current version of a corresponding resource and at least one past version of the corresponding resource. The processor is communicatively coupled to the memory and configured to: request a transaction on a resource of a repository; create a snapshot of the repository; perform reads and/or writes of the transaction against the snapshot; evaluate potential conflicts between concurrently committed transactions; if no conflict is found, commit the transaction by persisting it to a write-ahead log; and update the repository based on the write-ahead log.

20 Claims, 4 Drawing Sheets

(56) References Cited

U.S. PATENT DOCUMENTS 12,130,834 B1 10/2024 Dimitriev et al.
12,164,535 B2 12/2024 Bauer
12,298,859 B2 * 5/2025 Hiltunen ............. G06F 16/2365
12,321,264 B1 * 6/2025 Eluri ..................... G06F 16/215
12,505,089 B1 * 12/2025 Smith ................. G06F 16/2365
2013/0110767 A1 5/2013 Tatemura et al.
2013/0219135 A1 * 8/2013 Knowles ............... G06F 3/0673 711/E12.001
2016/0292212 A1 10/2016 Cheriton
2017/0220617 A1 8/2017 Bortnikov et al.
2019/0121704 A1 4/2019 Wei et al.
2023/0205757 A1 6/2023 Gupta et al.
2023/0315720 A1 10/2023 Luo et al.
2023/0385305 A1 11/2023 Angius et al.
2023/0401189 A1 12/2023 Katsipoulakis et al.
2024/0176775 A1 * 5/2024 Clinkenbeard ..... G06F 16/2379
2024/0248879 A1 7/2024 Dimitriev et al.
2024/0248905 A1 7/2024 Dimitriev et al.
2025/0094289 A1 * 3/2025 Hiltunen ............. G06F 11/1458
2025/0190633 A1 * 6/2025 Tian .................... G06F 21/6218
2025/0225036 A1 * 7/2025 Hiltunen ............. G06F 11/1458
2025/0278291 A1 * 9/2025 Shao ....................... G06F 9/466
2026/0046317 A1 * 2/2026 Crabtree ............... H04L 63/104
2026/0111416 A1 * 4/2026 Smith ................. G06F 16/2365
2026/0119455 A1 * 4/2026 Birka .................. G06F 16/1734

OTHER PUBLICATIONS

Gray, J. et al., "Consensus on Transaction Commit," ACM Transactions on Database Systems, vol. 31, Issue 1, Mar. 2006, pp. 133-160.
PCT International Search Report and Written Opinion, PCT Application No. PCT/IB2024/054505, Aug. 21, 2024, nine pages.
United States Office Action, U.S. Appl. No. 18/368,378, filed Sep. 6, 2024, 10 pages.

* cited by examiner

TRANSACTIONAL ACCESS TO RESOURCE REPOSITORIES

CROSS-REFERENCE TO RELATED APPLICATIONS

This application is a continuation of U.S. patent application Ser. No. 18/368,378, filed Sep. 14, 2023, which is incorporated by reference.

BACKGROUND

Technical Field

The subject matter described relates to providing transactional access to resource repositories.

Background Information

Resources, like source code, can be managed through a resource repository system. However, the resource repository system may not guarantee Atomicity, Consistency, Isolation, and Durability (ACID) properties. Not adhering to ACID properties can lead to various issues with data integrity and correctness. The properties guarantee:

- Atomicity: a transaction's changes are performed as a single unit. Either all changes of a transaction are successfully performed or none of them are.
- Consistency: the data is always in consistent state when the transaction begins and ends.
- Isolation: transactions are isolated from the changes of other concurrent transactions. Transactions behave as if they were executed serially, one after one sequentially even if they were actually executed concurrently.
- Durability: the changes committed by a transaction are persisted even in face of system failures.

SUMMARY

The above and other problems may be addressed by systems and methods for providing transactional access to resource repositories. In one embodiment, the resource repository system includes a processor and a memory for storing data structures. Each data structure can store a current version of a corresponding resource and at least one past version of the corresponding resource. The processor is communicatively coupled to the memory and configured to: request a transaction on a resource; create a snapshot of the repository; perform the transaction's reads and/or writes against the snapshot; evaluate potential conflicts between the transaction and other concurrently committed transactions; if no conflict is found, commit the transaction to a write-ahead log; and update the repository based on the write-ahead log.

DETAILED DESCRIPTION

The figures and the following description describe certain embodiments by way of illustration only. One skilled in the art will readily recognize from the following description that alternative embodiments of the structures and methods may be employed without departing from the principles described. Wherever practicable, similar or like reference numbers are used in the figures to indicate similar or like functionality. Where elements share a common numeral followed by a different letter, this indicates the elements are similar or identical. A reference to the numeral alone generally refers to any one or any combination of such elements unless the context indicates otherwise.

Example Systems

Figure 1:
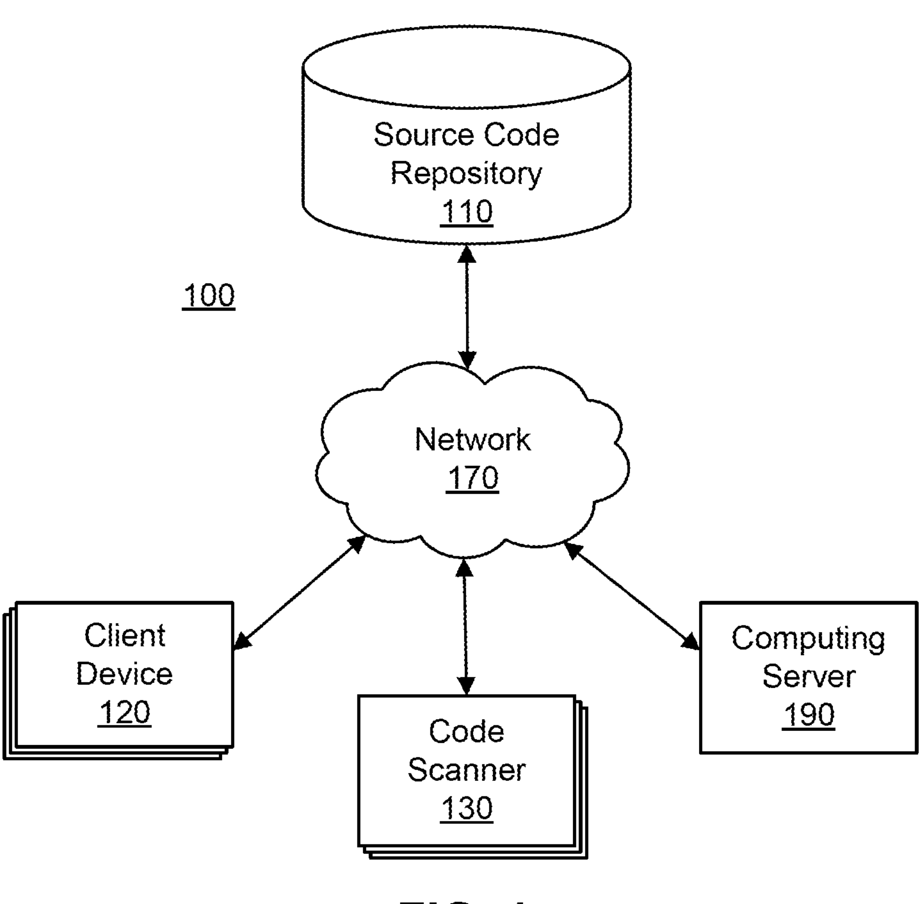
FIG. 1 is a block diagram of a networked computing environment suitable for managing the code of a software project, according to one embodiment.

FIG. 1 illustrates one embodiment of a networked computing environment 100 suitable for managing the code of a software project. In the embodiment shown, the networked computing environment includes a source code repository 110, one or more client devices 120, one or more code scanners 130, and a computing server 190, all connected via a network 170. In other embodiments, the networked computing environment 100 includes different or additional elements. In addition, the functions may be distributed among the elements in a different manner than described. For example, although the code scanners 130 and the computing server 190 are shown as distinct entities, in some embodiments the corresponding functionality is provided by a single computing system (e.g., a server).

The source code repository 110 includes one or more computer-readable storage media that store the code for one or more software projects. In one embodiment, the source code repository 110 stores the code for a source code management (SCM) system. The SCM system may store multiple versions of the code for the software project to enable updates to be rolled back and developers to review the historical status of the code, etc.

The client devices 120 are computing devices with which software engineers may edit code and commit updates to the code repository 110. For example, a client device 120 may be a desktop workstation with which an engineer downloads a portion of code from the source code repository 110, makes and tests revisions in a development environment, and uploads the revised code to the source code repository 110. Multiple engineers may each use a corresponding client device 120 to revise code and commit those revisions to the source code repository 110 at any given time. Known suitable techniques may be used to manage conflicts between updates made to the code by different engineers at approximately the same time.

The code scanners 130 (or code analyzers) continuously or periodically analyze source codes in the repository 110 to identify potential issues, vulnerabilities, or coding style violations. These code scanners 130 help improve the overall quality, security, and maintainability of the source codes by detecting problems early in the development process. Integrating code scanner 130 into the system 100 can enhance workflow, promote best practices, and ensure that source codes meet specific quality standards.

For example, code scanners perform static analysis by examining the source codes without actually executing it.

This helps in identifying common coding issues, such as syntax errors, bugs, inefficiencies, or security vulnerabilities, that could lead to runtime errors or security breaches when the code is executed. The code scanners can also analyze the source codes for adherence to various quality metrics, including code complexity, maintainability, and readability. They might also check for compliance with predefined coding standards, such as PEP 8 for Python or Google Java Style Guide for Java.

Some code scanners can specialize in identifying security vulnerabilities that could be exploited by hackers or malicious users. These tools check for issues like SQL injection, cross-site scripting (XSS), or insecure data handling practices. Further, some code scanners can be integrated into a Git environment and development workflow, such as hooking into Git pre-commit or pre-push stages or being triggered by continuous integration (CI) systems. This ensures that the source codes are analyzed and validated before it is merged into a main repository or deployed in production.

The computing server 190 facilitates collaboration between different components of the system 100 and provides a centralized control for remote repository 110. The computing server 190 allows multiple developers to access, fetch, push, and synchronize their changes with the remote repository 110. This enables developers to maintain a backup of their work, ensuring that changes and previous versions are safe and accessible. The server also serves as a backup and keeps a copy of entire project histories.

The computing server 190 can also allow multiple developers to collaborate on the same project, fetching and pushing changes to the remote repositories. This enables them to work concurrently on different features or bug fixes while keeping the codebase in sync. The computing server 190 can also be configured to enforce access control and security policies, allowing only authorized users to access specific repositories or perform specific operations. This helps in maintaining the confidentiality and integrity of the project files.

The computing server 190 can be integrated with various tools and services, such as continuous integration (CI) and continuous deployment (CD) platforms. This allows for automated builds, testing, and deployment of the project, streamlining the development and delivery process. The computing server 190 can further enable developers to perform code reviews, merge requests, and manage branches through web interfaces or other collaboration tools, fostering a consistent and transparent review process.

The network 170 provides the communication channels via which the other elements of the networked computing environment 100 communicate. The network 170 can include any combination of local area and wide area networks, using wired or wireless communication systems. In one embodiment, the network 170 uses standard communications technologies and protocols. For example, the network 170 can include communication links using technologies such as Ethernet, 802.11, worldwide interoperability for microwave access (WiMAX), 3G, 4G, 5G, code division multiple access (CDMA), digital subscriber line (DSL), etc. Examples of networking protocols used for communicating via the network 170 include multiprotocol label switching (MPLS), transmission control protocol/Internet protocol (TCP/IP), hypertext transport protocol (HTTP), simple mail transfer protocol (SMTP), and file transfer protocol (FTP). Data exchanged over the network 170 may be represented using any suitable format, such as hypertext markup language (HTML) or extensible markup language (XML). In some embodiments, some or all of the communication links of the network 170 may be encrypted using any suitable technique or techniques.

Figure 2:
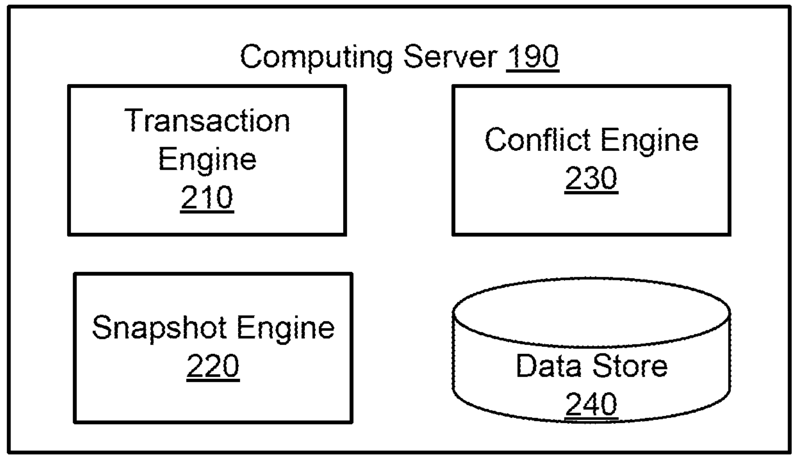
FIG. 2 illustrates a block diagram of the computing server of FIG. 1, according to one embodiment.

FIG. 2 illustrates one embodiment of the computing server 190 of FIG. 1. In the embodiment shown, the computing server 190 includes a transaction engine 210 (or transaction manager), a snapshot engine 220, a conflict engine 230, and a data store 240. In other embodiments, the computing server 190 includes different or additional elements. In addition, the functions may be distributed among the elements in a different manner than described.

In some embodiments, the transaction engine 210, the snapshot engine 220 and the conflict engine 230 may include one or more processors that execute machine instructions stored in the data store 240 to enable execution of different processes and/or transaction types as mentioned in the present disclosure, and to manage the data stored in the data store 240.

The transaction engine 210 provides the tools to manage and perform transactions on data stored in the data store 240 and/or other databases. For example, the transaction engine 210 may also receive various requests for performing transactions on resources of a repository of the source code repository 110 of FIG. 1. The transaction engine 210 may save a list of the transactions in the data store 240. The data store 240 may be distributed and may include memory and/or data storage mediums.

The snapshot engine 220 manages the creation, retrieval and/or deletion of snapshots. When creating a snapshot of a repository, the snapshot engine 220 creates a clone of the repository into a temporary directory in the data store 240. For example, the clone may be created by copying the directory structure of the repository and hard linking its files into place. Other methods are also possible as described later. While snapshots are being created, any new write and/or read into the repository may be blocked to maintain consistency.

The conflict engine 230 manages conflicts that may arise when transactions are performed. Each transaction stages its changes against their own snapshot of the repository. This may lead to multiple transactions attempting to commit conflicting modifications to the same resources as they do not see each other's modifications. The conflict engine 230 can detect potential conflicts between a transaction and other transactions that were concurrently committed. To detect conflicts, the conflict engine may check the concurrently committed transactions, stored for example in memory or the write-ahead log, to determine whether a resource was changed by concurrently committed transaction.

If a conflict is found, the transaction engine 210 may either resolve the conflict according to the rules of the application logic or discard the transaction in question and delete the state associated with it. In the event of a conflict, the transaction engine 210 may also provide an alert associated with the conflict to the user. If no conflict is found, the transaction engine 210 may commit transactions to a write-ahead log and update the repository based on the transactions logged in the write-ahead log. In some embodiments, transaction engine 210 commits transaction to the write-ahead log by creating a new copy of the resource, performing one or more modifications associated with the transaction on the new copy of the resource, replacing the hard link associating the snapshot to the resource with a new hard link associating the snapshot to the new copy of the resource, and logging the transaction to the write-ahead log. When updating a repository, the transaction engine 210 reads the write-ahead log to identify a transaction. Once the transaction is identified, the transaction engine 210 applies the transaction to the repository by performing the changes recorded in the transaction by for example replacing the resource with the new copy of the resource in the repository.

Once a transaction has been committed to the write-ahead log, the snapshot engine 220 may delete the state associated with the transaction.

Example Methods

Figure 3:
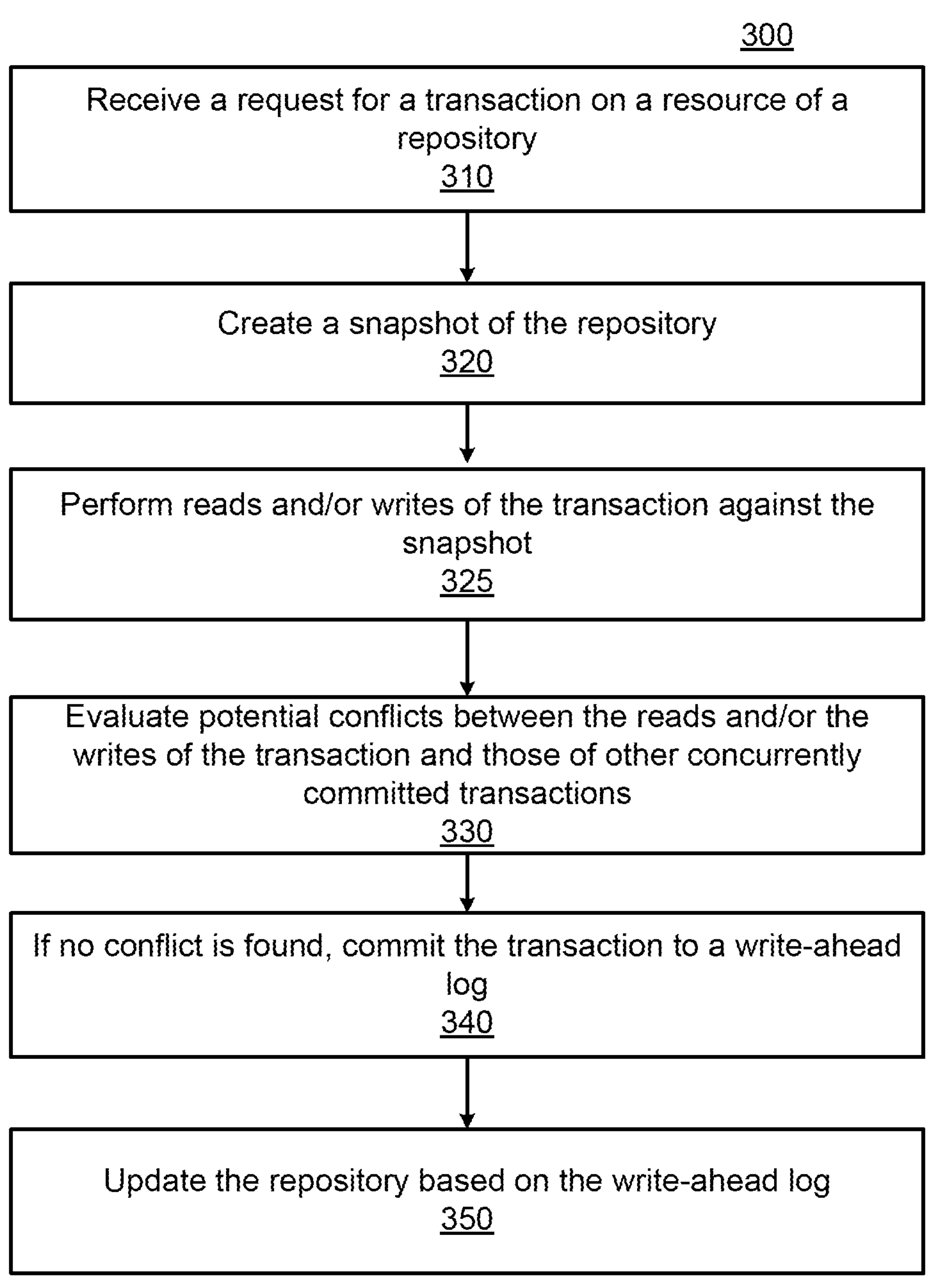
FIG. 3 is a flowchart depicting a process for providing transactional access to a resource repository, according to one embodiment.

FIG. 3 is a flowchart depicting an example process 300 for providing transactional access to a resource repository, in accordance with some embodiments. Various steps in the process 300 may be processes that are performed by the transaction engine 210, the snapshot engine 220, the conflict engine 230, or other engines in the computing server 190. Various processes may be implemented as one or more software algorithms. The software algorithm may be stored as computer instructions that are executable by one or more general processors (e.g., CPUs, GPUs). The instructions, when executed by the processors, cause the processors to perform various steps described. In various embodiments, one or more steps described may be skipped or changed. Steps described in FIG. 3 may also be combined with those in other figures. A computer-implemented process may be performed by the computing server 140, although the process may also be performed by another suitable computer.

At 310, the computing server receives a request for a transaction on a resource of a repository. For example, the request may be received from a user of the client device 120 of FIG. 1.

At 320, the computing server creates a snapshot of the repository by copying a directory structure of the repository into a temporary directory and hard linking resources of the repository to the temporary directory. In some implementations of the present disclosure, a snapshot refers to a view of the repository (e.g., a database system) or at least a portion thereof as it exists at the time of the snapshot is created. For example, a query that starts under a particular snapshot would have available to it records as they exists at the time of the snapshot. For example, the query would not see changes that are made to the records of the repository after the snapshot is acquired.

In some embodiments, a hard link is a directory entry that associate a name with a resource (e.g., a file). A resource can have multiple hard links (i.e., names) pointing to it. Since the hard links are pointers to the resource, changing the content of the resource would change the content as seen through each one of the hard links. In contrast, if a hard link was removed or pointed to a different resource, only that particular link to the resource is removed or points to the different resource; and the other hard links still point to the same resource.

In some embodiments, the computing server can block writes into the repository while one or more snapshots are created to maintain consistency. To maintain consistency, the computing server may also block reads, such as snapshot creation, while transactions are being applied to the repository.

At 325, the computing server performs reads and/or writes of the transaction against the snapshot. At 330, the computing server evaluates potential conflicts between the transaction and other concurrently committed transactions. Potential conflicts may include a write conflict, a read conflict or any other types of defined conflicts. In some embodiments, the computing server can evaluate the potential conflicts by checking transactions logged in a write-ahead log to determine whether the resource in question is changed by a concurrent transaction that committed against the repository.

At 340, the computing server commits the transaction to the write-ahead log if no conflict is found. Advantageously, the write-ahead log records the changes to be performed so that they can be recovered from the log. If the act of applying the changes from the log is interrupted, it is possible to recover the remaining changes that need to be done from the write-ahead log. Without logging the changes first, knowledge of what update was about to be done may be lost if the server crashes. For example, the transaction is considered committed once it has been logged, or in other words, persisted to the write-ahead log. At that point, it is stored permanently in the data store and can be recovered even after crashes.

In some embodiments, the computing server commits the transaction to the write-ahead log by: creating a new copy of the resource; performing one or more modifications associated with the transaction on the new copy of the resource; replacing the hard link associating the snapshot to the resource with a new hard link associating the snapshot to the new copy of the resource; and logging the transaction to the write-ahead log. If a conflict if found, the computing server may provide an alert associated with the conflict to the user, abort the transaction or resolve the conflict.

The goal of the conflict check is to provide serializability. A conflict check is conducted to ensure that the final outcome after committing and applying all of the concurrent transactions is the same as if they ran one-by-one in some order. Snapshot isolation may lead to two main transaction anomalies that can occur: (a) lost update; and (b) write skew.

For example, a lost update may occur where a transaction does not see changes other transactions are concurrently making. Each of them sees the repository in the state it was at the beginning of the transaction. This creates a problem where committing two transactions updating the same value may lead to a losing one of the updates. For example: let Transaction 1 be T1 and Transaction 2 be T2. T1 and T2 begin at the same time. 'Main' branch points to 'commit-A'. T1 updates branch 'main' to 'commit-B' only if 'main' points to 'commit-A'. T2 updates branch 'main' to 'commit-C' only if 'main' points to 'commit-A'. Since both T1 and T2 have 'main' pointing to 'commit-A' in their snapshots, they both perform the update. They do not see each other's changes. If the transactions are committed in order of T1 followed by T2, T2 would set 'main' to 'commit-C' even if it points to 'commit-B' now. This is an incorrect result that would not happen if the transactions would happen one after the other, as T2 would read the update from T1 and abort.

A write skew is caused when a transaction does not take into consideration changes made by other transactions. For example: T1 and T2 begin at the same time. Value A is 1. T2 reads value A as 1. T1 updates value A to 2. T2 writes value B to 1 (i.e., the value of A) based on the earlier read. T1 commits, followed by T2 committing. The result is incorrect, as if the transactions were to execute one-by-one, T2 would have read value A as 2 as set by T1 and updated value B with it.

A lost update and a write skew can be identified by looking at the reads and writes performed by concurrent transactions when committing a transaction. If a concurrently committed transaction T1 has modified values read by T2 that is now committing, T2 is aborted to prevent these anomalies. Therefore, one way to handle conflicts is to identify them as described in the present disclosure and abort the latter transaction that attempts to commit if there are conflicts.

In some embodiments, the computing server may further discard transactions and delete state associated with the transactions accordingly. Referring back to FIG. 3, at 350, the computing server updates the repository based on the write-ahead log. In some embodiments, the computing server is configured to update the repository by reading the write-ahead log to identify the transaction and, based on the identified transaction, applying the transaction to the repository by performing the changes described in the transaction.

The computing server can also delete a transaction's state, including the snapshot, after committing the transaction to the write-ahead log. In some embodiments, if a crash occurs while one or more snapshots are created by transactions that have not yet committed, the computing server can discard the state related to the uncommitted transactions.

In some embodiments, if applying the transaction from the write-ahead log to the repository is interrupted due to a system failure (e.g., a server crash, etc.), the transaction can be recovered from the log on start-up. For example, the computing server may track the index of the last log entry that was successfully applied to the repository. After recovering from a crash, the computing server checks if the last successfully applied log entry is the latest in the log. If not, the write-ahead log entries are applied in order to the repository until all of the entries have been successfully applied. In some embodiments, the transactions to be applied to the repository are verified before they are logged. For example, this involves checking the updates are valid by inspecting them for invalid characters.

Overall, the computing server as disclosed in the present disclosure offers significant advantages in terms of transaction management, reliability, consistency, performance, and ease of integration. For example, the computing server offers transaction management that guarantees ACID-properties for each transaction, ensuring reliable and consistent processing of changes in a Git environment. The computing server also provides serializable snapshot isolation (SSI), which ensures that transactions that execute concurrently but operate on the same data behave as if they were executed serially. This prevents issues such as lost updates and write skews, leading to a more reliable Git environment. The computing server also offers multi version concurrency control, which allows multiple transactions to execute concurrently without blocking each other, leading to better performance and efficiency in the Git environment.

In addition, the computing server uses a write-ahead log for durability and atomicity to store transaction changes before they are committed to the repository, ensuring that if system failures occur, the changes can be recovered from the write-ahead log and applied to the repository, preserving data integrity. Furthermore, in the event of system failures or crashes, the computing server offers crash recovery functions by recovering committed transactions from the write-ahead log and update the repository accordingly, ensuring the integrity and consistency of the repository. The computing server also advantageously allows minimal changes to existing code by providing features and transaction management capabilities without requiring extensive modifications to the existing resource repository system, making it more accessible and easing the process of incorporating the system into existing environments.

The ACID-properties are achieved without Git itself providing such guarantees. The described approach achieves this through the use of snapshotting, capturing the changes performed by the transactions in the snapshots, handling conflicts between concurrent transactions and committing and applying the transactions through the write-ahead log.

Further, the computing server provides ease of access and contribution to the resource repository system. More precisely, with the computing server, users can access or contribute to the resource repository system efficiently and effectively, promoting better collaboration among developers and ensuring a smooth development process.

Examples of Snapshot Creation and Transactions

In some embodiments, each transaction gets a snapshot of the state of the repository when the transaction begins. For this reason, initially, the snapshot is identical to the repository. The snapshots and the repository can diverge by way of: (a) commitment of new transactions and application of their log entries to the repository; and (b) changes made by the transactions in their own snapshots.

More precisely, with respect to (a), new transactions can be committed and their log entries can be applied to the repository. Consequently, their modifications can introduce new references or objects. Therefore, their resources will not be retroactively available to the already taken snapshots as they would otherwise modify the snapshot.

With respect to (b), the transactions may make changes in their own snapshots. This again may modify the resources (e.g., reference files, objects, etc.) in the snapshots. These changes will not be visible in other snapshots as otherwise they would see each other's yet uncommitted changes, and thus not be isolated from each other.

Snapshot creation entails making a clone of the repository that is semantically independent from the repository itself. This can be achieved by for example:

- Copying the directory structure of the repository into a temporary directory, and hard linking the repository's files in place. This approach relies on the files not being updated in place as this would modify the file in all of the clones of the repository linking to the same file. The files would instead be updated by writing a new file, and replacing the hard link to maintain isolation.
- Using a file system's copy-on-write functionality to create a clone of the repository into a temporary directory. This method may be more performant due to not having to copy the directory structure. As the file system would make copies of modified parts to maintain isolation, this supports modifying the files in place.
- Any other means of creating an independent clone of the repository. Copying the directory structure and the files into a temporary directory would also suffice although it would be heavy performance wise.

Therefore, the changes performed in the snapshots, or the main repository do not affect each other. On a logical level, performance of the changes may look like the following. Version 1 of Resource A is stored in the Repository A as shown in Table 1 below. Still in Table 1, two transactions (T1 and T2) creates two snapshots (Snapshot 1 and Snapshot 2). Both snapshots are created by cloning the Repository 1 as described above. Referring to Table 1, version-1 of Resource A is stored in the FileSystem (e.g., data store) and the Write-ahead Log is empty.

TABLE 1

| | |
|---|---|
| Repository A | Resource A → version-1 |
| T1: Snapshot 1 | Resource A → version-1 |

TABLE 1-continued

| | |
|---|---|
| T2: Snapshot 2 | Resource A → version-1 |
| Write-ahead Log | |
| Resources stored in the FileSystem | version-1 of Resource A |

Referring to Table 2, transaction T1 now makes modifications to Resource A into its snapshot (i.e., Snapshot 1). This creates a new version (i.e., version 2) of Resource A as shown in Table 2. Therefore, snapshot 1 points to version 2 of Resource A. The main repository (Repository A) is still unmodified, as well as Snapshot 2 as shown in Table 2. Version 2 of Resource A is now saved in the FileSystem and the Write-ahead Log is still empty.

TABLE 2

| | |
|---|---|
| Repository A | Resource A → version-1 |
| T1: Snapshot 1 | Resource A → version-2 |
| T2: Snapshot 2 | Resource A → version-1 |
| Write-ahead Log | |
| Resources stored on the FileSystem | version-1 of Resource A<br>version-2 of Resource A |

Now, if the transaction T1 operating on Snapshot 1 commits, Snapshot 1 gets removed and the write is logged in the Write-ahead Log as shown in Table 3.

TABLE 3

| | |
|---|---|
| Repository A | Resource A → version-1 |
| T2: Snapshot 2 | Resource A → version-1 |
| Write-ahead Log | Transaction 1:<br>File-A → version 2 |
| Resources stored on the FileSystem | version-1 of Resource A<br>version-2 of Resource A |

The write then gets applied to the repository from the Write-Ahead Log as shown in Table 4.

TABLE 4

| | |
|---|---|
| Repository A | Resource A → version-2 |
| T2: Snapshot 2 | Resource A → version-1 |
| Write-ahead Log | |
| Resources stored on the FileSystem | version-1 of Resource A<br>version-2 of Resource A |

Referring now to Table 5, after a conflict check where it is determined that Resource A is changed by transaction T1 that committed, transaction T2 is aborted. As transaction T2 had the only hard link to the version-1 of Resource A, the FileSystem removes the version-1 of Resource A.

TABLE 5

| | |
|---|---|
| Repository A | Resource A → version-2 |
| Write-ahead Log | |
| Resources stored on the FileSystem | version-2 of Resource A |

As shown in the exemplary embodiments above, the snapshots contain the latest committed state of the repository at the time a transaction begins. The snapshots are not modified subsequently unless a transaction itself performs some changes. Once a transaction commits, the repository is updated to reflect the new state of the repository. The old resources corresponding to the prior state of the repository will not be used anymore in the new snapshots, which are taken afterwards as they always contain the latest committed state. Snapshots that were taken prior to another transaction committing remain isolated from the changes, and will keep the old resources in place. Once the old resources are not linked to by any snapshots, the filesystem automatically removes them.

Transaction Flow

Figure 4:
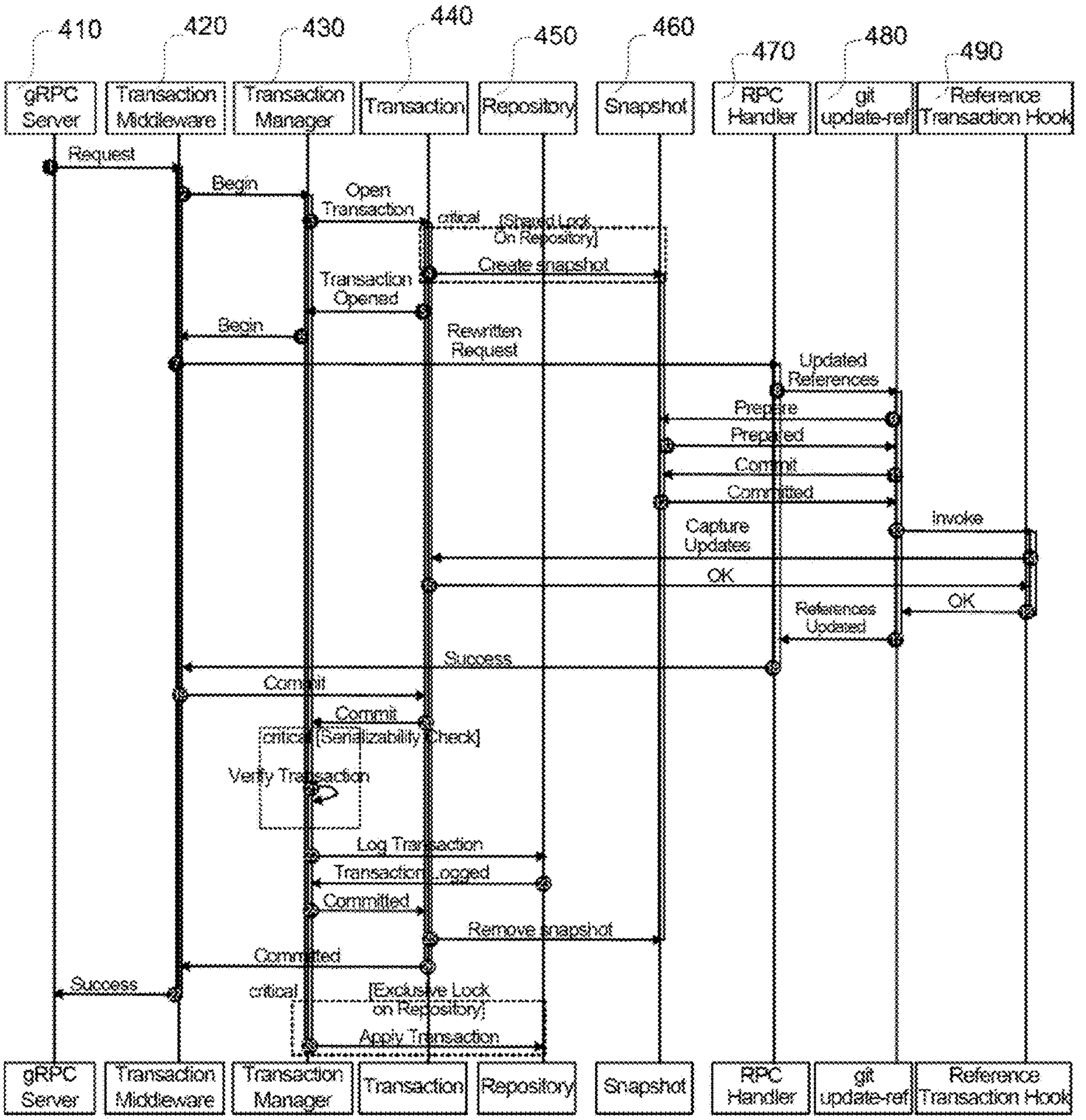
FIG. 4 illustrate a sequence diagram describing how transaction flows, according to one embodiment.

FIG. 4 depicts a sequence diagram describing how a transaction flow through the different parts of a resource repository system according to one embodiment.

Referring to FIG. 4, the remote procedure call (RPC) server 410 (e.g., gRPC server) is a server-side component in an RPC communication system, which makes use of an RPC framework that allows efficient and scalable communication between distributed software components or services. It is particularly suitable for microservices architecture and is designed to work over HTTP/2, with support for bidirectional streaming, flow control, and header compression. The server 410 listens for incoming requests from RPC clients and processes those requests by invoking the appropriate functions or methods. Once the processing is complete, the server 410 sends the results back to the client in an efficient, structured format using protocol buffers, which is a language-agnostic binary serialization format.

The transaction middleware 420 is a software component that manages the lifecycle of transactions within the gRPC server 410. The transaction middleware 420 may be responsible for managing the beginning, execution, and completion of transactions 440. The RPC handler 470 processes requests to perform actions on the repository 450. The transaction middleware 420 opens a transaction covering the repository 450. This creates a snapshot 460 of the repository 450. The request to be processed by RPC handler 470 is rewritten to point to the snapshot 460 instead of the repository 450. The RPC 470 handler then operates on the snapshot 460 rather than directly on the repository 450. This indirection allows for transparently plugging the transaction logic into an existing server.

The transaction manager 430 is a software component responsible for coordinating and managing transactions in a distributed or multi-tiered system, and operates as a centralized control point, managing transactions 440 across various resources such as databases, message queues, or other services. In some embodiments, the transaction manager 430 may provide the same functions provided by the transaction engine 210 of FIG. 2.

The repository 450 is a centralized storage location where the complete history of a project, along with its files and changes, are stored. The repository 450 helps in tracking the evolution of the project over time and facilitates collaboration among multiple contributors. The repository 450 allows users to access previous versions of the files, compare changes made, and revert to an earlier state if required. Additionally, the repository 450 provides users with the ability to branch or fork the project, allowing for experimentation and development of new features without affecting the main working codebase.

The snapshot 460 is used to provide the transaction 440 with an isolated view of the repository 450. The transaction 440 sees the repository's 450 state in the snapshot 460 as it was when the transaction began and its own changes to the snapshot. This ensures the transactions are isolated from the changes made by other concurrent transactions in their snapshots and committed to the repository.

The RPC handler 470 is a software component is responsible for processing the client's request. For example, the client may wish to read from the repository or write into it. The RPC handler 470 runs the request against the repository specified in the request. This request is rewritten by the transaction middleware 420 to point to the snapshot 460 instead of the original repository 450. The RPC handler 470 performs the operation targeting the snapshot 460 of the repository 450. The RPC handler 470 returns the result to the client after performing the operation.

git update-ref 480 is a Git command used to modify or update references, such as branches or tags within a Git repository. These references typically point to commit objects, representing a specific state of the repository at a given point. The changes made within the transaction 440 target the transaction's snapshot 460 of the repository 450. This ensures no changes are performed in the repository 450 without first committing them through the Transaction Manager 430 into the write-ahead log first.

The reference transaction hook 490 is a software component that triggers specific actions before or after certain events in a transaction process. It allows customization and/or extension of the default behavior of the system or application involved in transactions. In some embodiments, the reference transaction hook involves Git hooks, which are custom scripts that are executed at specific points in the workflow. The reference transaction hook 490 invoked by Git whenever it is modifying references in a Git repository. It is used to capture the reference changes performed within the transaction 440 against the snapshot 460. The reference changes are captured in the transaction to be committed later through the Transaction Manager 430 into the write-ahead log.

FIG. 4 shows some of the key points of how transactions 440 can be handled. Each transaction 440 has a snapshot of the repository 450. The RPC handlers may never operate on the repository itself. The changes performed in the snapshot are captured in the transaction. The changes can be committed after the RPC has returned successfully. The transaction is asynchronously applied to the repository from the write-ahead log. The transaction middleware 420 integrates with existing server logic and makes it transactional without requiring large changes to the existing code in RPC Handlers 470.

Still referring to FIG. 4, the locking sections show that there are only a few synchronization points. Transactions 440 can in general proceed without any blocking. A shared lock is acquired on the repository when the snapshot is being created. Multiple snapshots can be taken at the same time but the no changes can be written into the repository. Transactions run concurrently without any blocking until the commit call where the serializability checks are done. The log application acquires an exclusive lock on the repository which blocks snapshotting.

Computing System Architecture

Figure 5:
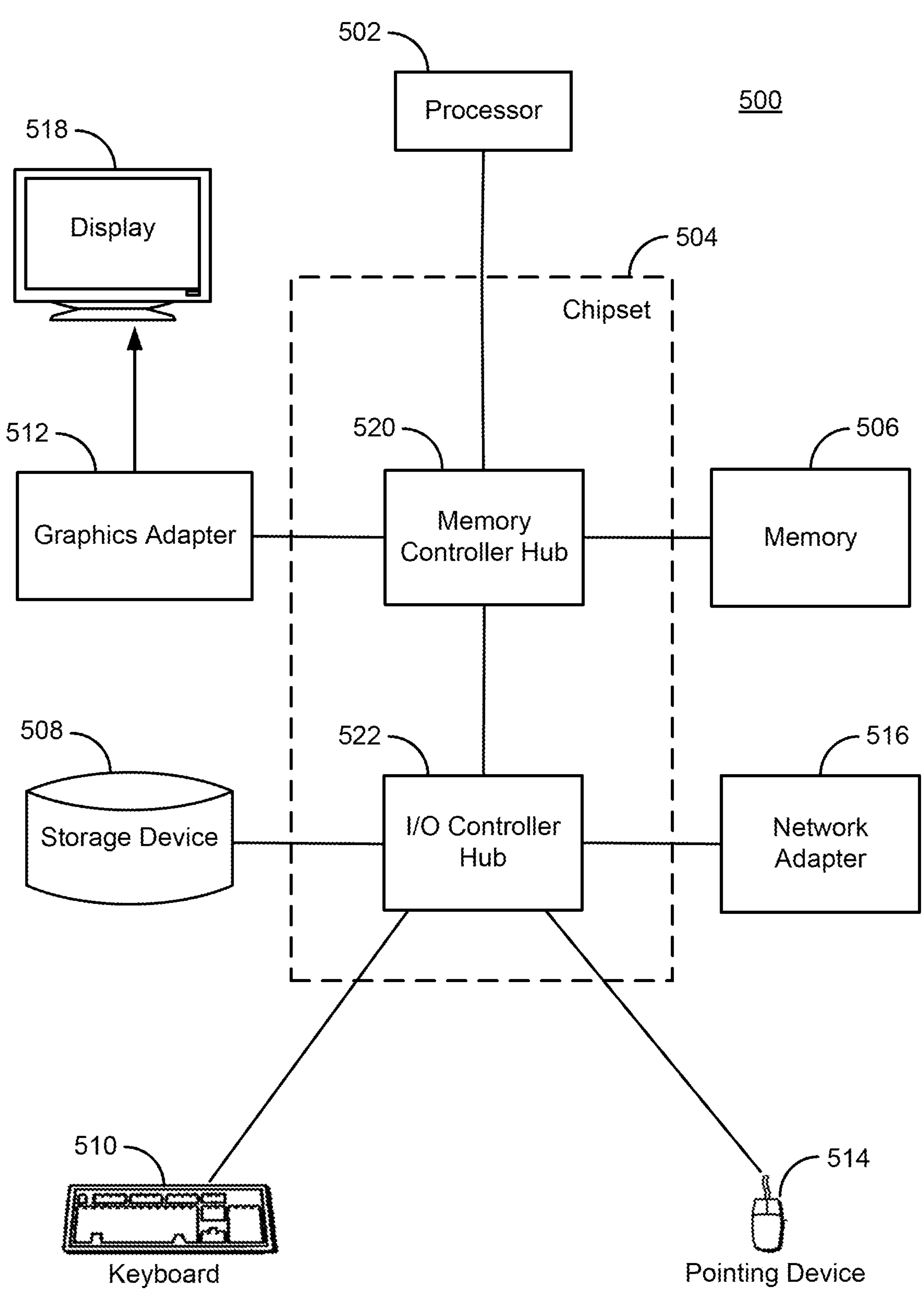
FIG. 5 is a block diagram illustrating an example computer suitable for use in the networked computing environment of FIG. 1, according to one embodiment.

FIG. 5 is a block diagram of an example computer 500 suitable for use as a client device 120, code scanner 130, or computing server 190, or for hosting the source code repository 110. The example computer 500 includes at least one processor 502 coupled to a chipset 504. The chipset 504 includes a memory controller hub 520 and an input/output (I/O) controller hub 522. A memory 506 and a graphics adapter 512 are coupled to the memory controller hub 520, and a display 518 is coupled to the graphics adapter 512. A storage device 508, keyboard 510, pointing device 514, and network adapter 516 are coupled to the I/O controller hub 522. Other embodiments of the computer 500 have different architectures.

In the embodiment shown in FIG. 5, the storage device 508 is a non-transitory computer-readable storage medium such as a hard drive, compact disk read-only memory (CD-ROM), DVD, or a solid-state memory device. The memory 506 holds instructions and data used by the processor 502. The pointing device 514 is a mouse, track ball, touch-screen, or other type of pointing device, and may be used in combination with the keyboard 510 (which may be an on-screen keyboard) to input data into the computer system 500. The graphics adapter 512 displays images and other information on the display 518. The network adapter 516 couples the computer system 500 to one or more computer networks, such as network 170.

The types of computers used by the entities of FIGS. 1 and 2 can vary depending upon the embodiment and the processing power required by the entity. For example, a system hosting the source code repository 110 might include multiple blade servers working together to provide the functionality described while a client device 120 might be a desktop workstation or tablet. Furthermore, computers 500 can lack some of the components described above, such as keyboards 510, graphics adapters 512, and displays 518.

ADDITIONAL CONSIDERATIONS

Some portions of the above description describe the embodiments in terms of algorithmic processes or operations. These algorithmic descriptions and representations are commonly used by those skilled in the computing arts to convey the substance of their work effectively to others skilled in the art. These operations, while described functionally, computationally, or logically, are understood to be implemented by computer programs comprising instructions for execution by a processor or equivalent electrical circuits, microcode, or the like. Furthermore, it has also proven convenient at times, to refer to these arrangements of functional operations as modules, without loss of generality.

As used herein, any reference to "one embodiment" or "an embodiment" means that a particular element, feature, structure, or characteristic described in connection with the embodiment is included in at least one embodiment. The appearances of the phrase "in one embodiment" in various places in the specification are not necessarily all referring to the same embodiment. Similarly, use of "a" or "an" preceding an element or component is done merely for convenience. This description should be understood to mean that one or more of the elements or components are present unless it is obvious that it is meant otherwise.

Where values are described as "approximate" or "substantially" (or their derivatives), such values should be construed as accurate +/−10% unless another meaning is apparent from the context. From example, "approximately ten" should be understood to mean "in a range from nine to eleven."

As used herein, the terms "comprises," "comprising," "includes," "including," "has," "having" or any other variation thereof, are intended to cover a non-exclusive inclusion. For example, a process, method, article, or apparatus that comprises a list of elements is not necessarily limited to only those elements but may include other elements not expressly listed or inherent to such process, method, article, or apparatus. Further, unless expressly stated to the contrary, "or" refers to an inclusive or and not to an exclusive or. For example, a condition A or B is satisfied by any one of the following: A is true (or present) and B is false (or not present), A is false (or not present) and B is true (or present), and both A and B are true (or present).

Upon reading this disclosure, those of skill in the art will appreciate still additional alternative structural and functional designs for a system and a process for providing transactional access to resource repositories. Thus, while particular embodiments and applications have been illustrated and described, it is to be understood that the described subject matter is not limited to the precise construction and components disclosed. The scope of protection should be limited only by any claims that issue.

What is claimed is:

1. A resource repository system comprising:

a processor; and a memory communicatively coupled to the processor and storing instructions that, when executed, cause the resource repository system to perform operations comprising:

receiving a request for a transaction on a resource of a repository;

creating a snapshot of the repository, wherein a hard link associates the snapshot with the resource;

performing reads and/or writes of the transaction against the snapshot;

evaluating potential conflicts between the reads and/or the writes of the transaction and those of other concurrently committed transactions, wherein evaluating the potential conflicts comprises determining whether the resource of the repository is changed;

responsive to no conflict being found, committing the transaction to a write-ahead log, wherein committing the transaction to the write-ahead log comprises:

creating a new copy of the resource having one or more modifications associated with the transaction;

replacing the hard link associating the snapshot with the resource with a new hard link associating the snapshot to the new copy of the resource; and logging the transaction to the write-ahead log; and updating the repository to include the one or more modifications to the resource based on the write-ahead log.

2. The resource repository system of claim 1, wherein logging the transaction to the write-ahead log comprises:

creating a log entry containing changes to be committed with the transaction; and persisting the log entry into the write-ahead log.

3. The resource repository system of claim 2, wherein updating the repository comprises:

reading a transaction's changes from the write-ahead log; and based on the changes of the transaction, applying the transaction to the repository by performing the changes contained in the log entry.

4. The resource repository system of claim 1, wherein the operations further comprise deleting the snapshot after committing the transaction to the write-ahead log.

5. The resource repository system of claim 1, wherein evaluating the potential conflicts comprises:

checking transactions logged in the write-ahead log to determine whether the resource is changed by a concurrent transaction that committed concurrently against the repository.

6. The resource repository system of claim 1, wherein the operations further comprise blocking writes into the repository while the snapshot is created to maintain consistency.

7. The resource repository system of claim 1, wherein if a crash occurs while one or more transactions have been committed to the write-ahead log but not yet fully applied to the repository, the operations further comprise recovering committed transactions from the write-ahead log and update the repository accordingly.

8. The resource repository system of claim 1, wherein the operations further comprise:

receiving a second request for a second transaction on a second resource of the repository;

creating a second snapshot of the repository;

performing reads and/or writes of the second transaction against the second snapshot;

evaluating potential conflicts between the reads and/or the writes of the second transaction and those of other concurrently committed transactions, wherein evaluating the potential conflicts comprises determining whether the second resource of the repository is changed; and responsive to a conflict being found, discarding the second transaction and deleting the second snapshot associated with the second transaction.

9. The resource repository system of claim 8, wherein the operations further comprise providing an alert associated with the second transaction responsive to the conflict being found.

10. The system of claim 1, wherein creating the snapshot of the repository comprises:

copying a directory structure of the repository into a temporary directory and hard linking resources of the repository to the temporary directory; or using a copy-on-write functionality of a filesystem to create a clone of the repository into a temporary directory.

11. A method for performing a transaction on a resource on a database, the method comprising:

receiving a request for a transaction on a resource of a repository;

creating a snapshot of the repository, wherein a hard link associates the snapshot with the resource;

performing reads and/or writes of the transaction against the snapshot;

evaluating potential conflicts between the reads and/or the writes of the transaction and those of other concurrently committed transactions, wherein evaluating the potential conflicts comprises determining whether the resource of the repository is changed;

responsive to no conflict being found, committing the transaction to a write-ahead log, wherein committing the transaction to the write-ahead log comprises:

creating a new copy of the resource having one or more modifications associated with the transaction;

replacing the hard link associating the snapshot with the resource with a new hard link associating the snapshot to the new copy of the resource; and logging the transaction to the write-ahead log; and updating the repository to include the one or more modifications to the resource based on in the write-ahead log.

12. The method of claim 11, wherein logging the transaction to the write-ahead log comprises:

creating a log entry containing changes to be committed with the transaction; and persisting the log entry into the write-ahead log.

13. The method of claim 12, wherein updating the repository comprises:

reading a transaction's changes from the write-ahead log; and based on the changes of the transaction, applying the transaction to the repository by performing the changes contained in the log entry.

14. The method of claim 11 further comprises deleting the snapshot after committing the transaction to the write-ahead log.

15. The method of claim 11 wherein evaluating the potential conflicts comprises checking transactions logged in the write-ahead log to determine whether the resource is changed by a concurrent transaction that committed concurrently against the repository.

16. The method of claim 11 further comprising blocking writes into the repository while one or more snapshots are created to maintain consistency.

17. The method of claim 11 further comprising, if a crash occurs while one or more transactions have been committed to the write-ahead log but not yet fully applied to the repository, recovering committed transactions from the write-ahead log and updating the repository accordingly.

18. The method of claim 11 further comprising:

receiving a second request for a second transaction on a second resource of the repository;

creating a second snapshot of the repository;

performing reads and/or writes of the second transaction against the second snapshot;

evaluating potential conflicts between the reads and/or the writes of the second transaction and those of other concurrently committed transactions, wherein evaluating the potential conflicts comprises determining whether the second resource of the repository is changed; and responsive to a conflict being found, discarding the second transaction and delete the second snapshot associated with the second transaction.

19. The method of claim 11 wherein creating the snapshot of the repository comprises:

copying a directory structure of the repository into a temporary directory and hard linking resources of the repository to the temporary directory; or using a filesystem's copy-on-write functionality to create a clone of the repository into a temporary directory.

20. A computer program product comprising a non-transitory computer readable storage medium having instructions encoded thereon that, when executed by a computing system, cause the computing system to perform operations including:

creating a snapshot of a repository, wherein a hard link associates the snapshot with a resource;

performing reads and/or writes of a transaction involving the resource against the snapshot;

evaluating potential conflicts between the reads and/or the writes of the transaction and those of other concurrently committed transactions, wherein evaluating the potential conflicts comprises determining whether the resource of the repository is changed;

responsive to no conflict being found, committing the transaction to a write-ahead log, wherein committing the transaction to the write-ahead log comprises:

creating a new copy of the resource having one or more modifications associated with the transaction;

replacing the hard link associating the snapshot with the resource with a new hard link associating the snapshot to the new copy of the resource; and logging the transaction to the write-ahead log; and updating the repository to include the one or more modifications to the resource based on the write-ahead log.

* * * * *